United States Patent [19]

Mizuno et al.

[11] Patent Number: 5,026,464
[45] Date of Patent: Jun. 25, 1991

[54] METHOD AND APPARATUS FOR DECOMPOSING HALOGENATED ORGANIC COMPOUND

[75] Inventors: Koichi Mizuno, Ibaraki; Takeshige Wakabayashi; Yutaka Koinuma, both of Chiba; Reiji Aizawa, Ibaraki; Satoshi Kushiyama, Ibaraki; Satoru Kabayashi, Ibaraki; Hideo Ohuchi, Ibaraki; Toyonobu Yoshida, Tokyo; Yoshiro Kubota, Tokyo; Takanobu Amano, Tokyo; Hisashi Komaki, Tokyo; Shoji Hirakawa, Tokyo, all of Japan

[73] Assignees: Agency of Industrial Science and Technology, Tokyo, Japan; Toyonobu Yoshida, Tokyo, Japan; JEOL Ltd., Tokyo, Japan

[21] Appl. No.: 433,361

[22] Filed: Nov. 7, 1989

[30] Foreign Application Priority Data

Aug. 31, 1988 [JP] Japan .................................. 1-225211
Nov. 10, 1988 [JP] Japan ................................ 63-284098
Sep. 1, 1989 [JP] Japan .................................. 1-227083
Sep. 1, 1989 [JP] Japan .................................. 1-277084

[51] Int. Cl.⁵ .............................................. H05F 3/00
[52] U.S. Cl. ................................................... 204/164
[58] Field of Search ........................ 204/164; 252/372

[56] References Cited

U.S. PATENT DOCUMENTS 3,723,290 3/1973 Hamblyn et al. ..................... 204/164
3,933,608 1/1976 Haas et al. ............................ 204/164
4,657,738 4/1987 Kanter et al. ........................ 204/164

OTHER PUBLICATIONS

Chemical Abstract 101:176895p Barton et al.
Chemical Abstract 91:185434q Zimina et al.
"Laboratory Investigation of Thermal Degradation of a Mixture of Hazardous Organic Compounds", John L. Graham; Douglas L. Hall and Barry Dellinger, in *Environ. Sci. Technol.*, vol. 20, No. 7, 1986 pp. 703-710.

Primary Examiner—John F. Niebling
Assistant Examiner—Steven P. Marquis
Attorney, Agent, or Firm—Webb, Burden, Ziesenheim & Webb

[57] ABSTRACT

A halogenated organic compound is introduced into a plasma. In the plasma state, substances are very reactive and chemical substances which are not readily decomposed such as halogenated organic compounds are decomposed in a short time. Specifically, in a high-temperature plasma exceeding 10,000° C., almost all molecules are considered to dissociate into atoms. A reactive substance such as water is introduced into a plasma together with a halogenated organic compound. The decomposed halogenated organic compound is caused to react with the reactive substance, for preventing the decomposed organic compound from returning to its original state.

6 Claims, 4 Drawing Sheets

METHOD AND APPARATUS FOR DECOMPOSING HALOGENATED ORGANIC COMPOUND

FIELD OF THE INVENTION

The present invention relates to a method and an apparatus for efficiently decomposing halogenated organic compounds which are organic compounds, such as chlorofluorocarbons (CFCs) and trichloroethylene, containing fluorine, chlorine, or bromine.

BACKGROUND OF THE INVENTION

Halogenated organic compounds, which are organic compounds, such as CFCs and trichloroethylene, containing fluorine, chlorine, or bromine, find wide use as solvents, refrigerants, and fire extinguishing agents, and are employed in large quantities. Therefore, they are of importance in the industry. However, these compounds are volatile, and many of the halogenated organic compounds used in the industry are emitted to the environment such as the atmosphere, water, or soil. It has been pointed out that such emissions destroy the stratospheric ozone layer and generate carcinogenic substances, thus seriously affecting the environment.

Where used, halogenated organic compounds should be disposed of, no appropriate method of decomposing them is currently available because their reactivity is extremely low.

The decomposition techniques which have been heretofore reported are mainly combustion techniques at high temperatures. One example of decomposition of hazardous organic wastes using such techniques is described in an article entitled "Laboratory Investigation of Thermal Degradation of a Mixture of Hazardous Organic Compounds" by John L. Graham, Douglas L. Hall, and Barry Dellinger, in *Environ. Sci. Technol.*, Vol. 20, No. 7, 1986, pp. 703–710. In this method, however, the energy efficiency is extremely low, because halogenated organic compounds are burned together with a large amount of fuel, such as hydrocarbon. Further, the whole apparatus cannot be made in small size, since the fuel tank and the incinerator are large. In addition, free halogens produced by combustion come into contact with the wall of the incinerator that is at high temperatures to thereby attack the incinerator. This phenomenon is especially conspicuous where organic fluorine compounds are burned.

SUMMARY OF THE INVENTION

It is an object of the present invention to provide a method of efficiently decomposing halogenated organic compounds, such as chlorofluorocarbons (CFCs) and trichloroethylene, by plasma reaction.

It is another object of the invention to provide a method and an apparatus for efficiently decomposing halogenated organic compounds by efficiently supplying the compounds in a liquid phase into a plasma.

It is a further object of the invention to provide an apparatus capable of decomposing halogenated organic compounds without producing hazardous by-products.

The present inventors have investigated a method capable of easily decomposing halogenated organic compounds and have found a method of decomposition using a plasma produced either by induction heating making use of radio-frequency waves or microwaves or by DC heating. The present invention utilizes the fact that substances are very reactive in the plasma state. Even chemicals resistant to decomposition such as halogenated organic compounds can be decomposed in a short time. In particular, within a plasma with a temperature as high as 10,000° C., almost all molecules are considered to dissociate into atoms.

In accordance with the present invention, halogenated organic compounds are introduced into a plasma to decompose them. In one embodiment of the invention, a halogenated organic compound is introduced into a plasma, together with a substance for reacting with the decomposed halogenated organic compound, such as water. The decomposed compound is caused to react with water to prevent the decomposed compound from returning to its original state.

A preferred method according to this invention comprises bubbling a carrier gas through the halogenated organic compound that is in liquid phase, so that the compound is contained in the carrier gas, bubbling the carrier gas through a liquid substance for reacting with the decomposed halogenated organic compound so that the liquid substance may be contained in the carrier gas, and mixing the carrier gas containing the halogenated organic compound with the carrier gas containing the liquid substance. The mixture is then introduced into a plasma.

In accordance with this invention, there is also provided an apparatus for decomposing halogenated organic compounds. The apparatus comprises a chamber, for example, a cylindrical tube, and a gas supply nozzle opening into the tube. An RF coil is wound around the tube so that when excited it will heat the contents of the tube to the plasma state. A first container is provided for containing the halogenated organic compound in liquid phase. A carrier gas inlet tube is arranged to introduce a carrier gas source into the first container. A second container is provided to contain water. A carrier cas inlet tube is arranged to introduce carrier gas source into the second container. A gas mixer mixes the gas from the first container with the gas from the second container and forces the resulting mixture into the gas supply nozzle.

According to a preferred embodiment of the apparatus for decomposing halogenated organic compounds, a liquid intake tube is mounted in the gas supply nozzle into which a liquid to be supplied to the plasma formed in the chamber.

According to yet another preferred embodiment of the apparatus, means are provided for ejecting a gas or liquid into a portion of the plasma to extinguish the portion of the plasma.

DESCRIPTION OF THE PREFERRED EMBODIMENTS

Figure 1:
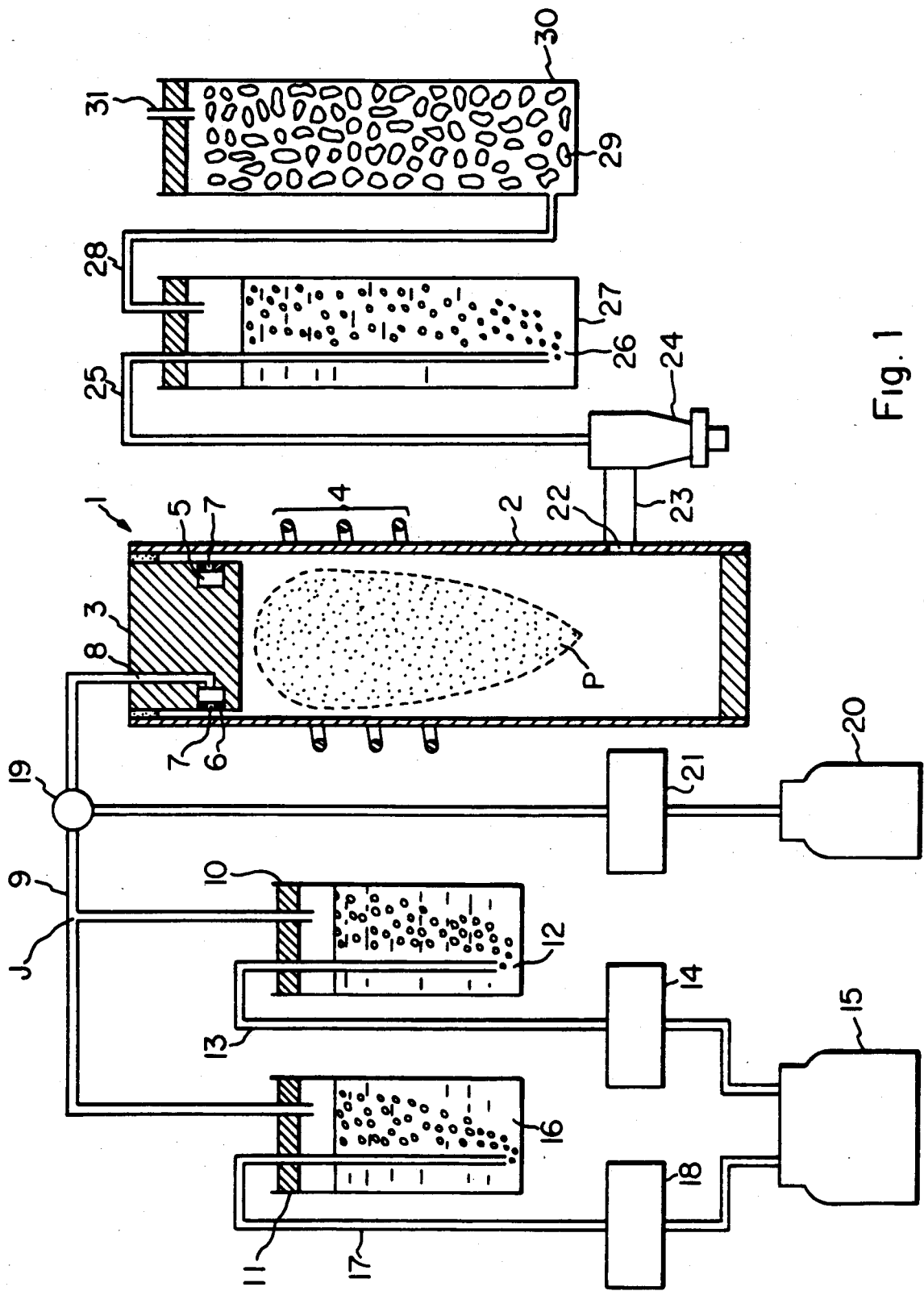
FIG. 1 is a schematic diagram of a system for decomposing a halogenated organic compound, the system being fabricated in accordance with the invention.

Referring to FIG. 1, there is shown a system according to the invention. This system has a torch 1 for producing a plasma by induction. The torch 1 comprises a cylindrical tube 2 made from an insulating material such as quartz, a gas supply nozzle 3, and an RF coil 4 wound around the tube 2. The nozzle 3 is provided with an annular groove 5. An annular plate 6 is welded to the outside of the groove 5. The plate 6 is provided with a number of minute holes 7. The groove 5 is connected with one end of a hole 8 formed in the nozzle 3. The other end of the hole 8 is connected with a tube 9 at the top of the nozzle 3.

The tube 9 branches into a first tubing extending into a first container 10 and a second tubing extending into a second container 11. The first container 10 holds a halogenated organic compound 12, such as CFC, to be decomposed and is in liquid phase. One end of a carrier gas supply tube 13 is inserted in the halogenated organic compound contained in the first container 10. The other end of the supply tube 13 is connected with an argon gas source 15 via a flow controller 14. The second container 11 contains water 16 in which one end of another carrier gas supply tube 17 is inserted, while the other end is connected with the argon gas source 15 via a flow controller 18.

A selector valve 19 is mounted in the tube 9 to force either gas coming from the first container 10 and the second container 11 or gas coming from the argon gas source 20 into the hole 8 formed in the nozzle 3. The flow of gas from the argon gas source 20 is controlled by the flow controller 21.

The cylindrical tube 2 forming the plasma torch 1 has an opening 22 near its lower end. An exhaust tube 23 that it connected with a cyclone 24 is connected with the opening 22. The cyclone 24 acts to trap powdered material contained in the exhaust fumes. The exhaust fumes passed through the cyclone 24 is guided into a tube 25 which extends into a container 27. An alkaline water solution 26 such as potassium hydroxide (KOH) is contained in the container 27. A tube 28 for discharging internal gas extends from the top of the container 27. The discharge tube 28 is connected with another container 30 near its bottom. The container 30 holds an alkaline solid 29, such as calcium oxide (CaO). The gas passed through the interstices among the particles of the solid 29 is allowed to escape through a discharge tube 31 extending from the top of the container 30.

The operation of the system constructed as described above is now described. In the initial state, the selector valve 19 mounted in the tube 9 is so operated that argon gas from the argon gas source 20 is supplied into the groove 5 via the hole 8 formed in the nozzle 3. The gas then passes through the numerous minute holes 7 formed in the plate 6, and are injected into the cylindrical tube 2. Under this condition, RF waves are supplied to the RF coil 4 to produce a plasma P by an igniting mechanism (not shown).

Subsequently, the selector valve 19 is switched to the other state so that the gases from the first container 10 and the second container 11 may be supplied into the groove 5 via the hole 8 in the nozzle 3, instead of the argon gas from the argon gas source 20. In the first container 10, the carrier gas supply tube 13 connected with the argon gas source 15 is immersed in the halogenated organic compound solution 12 contained in the container. The argon has is ejected from the end of the tube 13 which opens into the compound solution 12, at a flow rate controlled by the flow controller 14. Since the argon gas is bubbled through the organic compound solution 12, the vaporized organic compound is contained in the gaseous argon and discharged into the tube 9 from the first container 10. In the second container 11, the carrier gas supply tube 17 connected with the argon gas source 15 is inserted in the water 16 contained in the container. The argon gas is ejected from the end of the tube 17 that opens into the water 16, at a suitable flow rate controlled by the flow controller 18. Because the argon gas is bubbled through the water, the vaporized water is contained in the gaseous argon and discharged into the tube 9 from the second container 11.

The argon gas containing the vapor of halogenated organic compound is mixed with the argon gas containing the water vapor, at the branching point J of the tube 9. The mixture gas is forced into the groove 5 via the hole 8 in the nozzle 3. The mixture gas then passes through the numerous minute holes 7 formed in the plate 6 and is ejected into the tube 2. Finally, the mixture gas is admitted into the plasma P. At this time, the temperature of the plasma is between 10,000° C. and 15,000° C. The halogenated organic compound introduced into the plasma P are decomposed at a high efficiency because of the high temperature and caused to react.

Where trichlorofluoromethane (Freon 11) CCl$_3$F is decomposed as a halogenated organic compound within the plasma, the compound reacts with water as given by

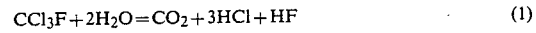

$$CCl_3F + 2H_2O = CO_2 + 3HCl + HF \qquad (1)$$

The exhaust fumes containing the decomposed molecules are sent to the cyclone 24 through the exhaust tube 23 from the opening 22 of the tube 2 that is located close to the bottom of the tube 2. At this time, if the water is insufficient in quantity as compared with the Freon 11, excessive carbon will be produced. Fine powder of carbon and other substances contained in the exhaust fumes are trapped in the cyclone 24. The gas passed through the cyclone 24 is introduced into the water solution of a potassium hydroxide 26 in the container 27 through the tube 25. As a result, the exhaust fumes containing acids such as HCl and HF are neutralized. The neutralized gas is admitted into the container 30 from the bottom of the container 26 via the exhaust tube 28 and then dehydrated by the calcium oxide 29 in the container 30. The dehydrated gas is a stable compound which hardly affects the environment. This gas is appropriately emitted into the atmosphere.

Since the high-temperature plasma P is produced close to the nozzle 3, this nozzle is heated by the plasma. Because the temperature of the plasma P is quite high, there arises the possibility that the nozzle melts or deforms. Therefore, it is necessary to form a coolant passage in the nozzle 3 and to circulate a coolant such as water or oil through the passage, for cooling the nozzle. If the temperature of the coolant is so low that the nozzle is cooled excessively, then the vaporized halogenated organic compound and water forced into the groove 5 through the hole 8 return into droplets. For this reason, it is desired to preheat the coolant to about 40° C. to 50° C., for preventing the nozzle from getting cooled excessively.

Table 1 shows the results of an experiment conducted to decompose trichlorofluoromethane (Freon 11) CCl$_3$F that is a halogenated organic compound, by the aforementioned system. In this experiment, the above-described system was used, and a gas chromatograph (not shown) was connected with the discharge tube 31. Qualitative and quantitative analyses were made of the gas decomposed by the plasma. The used induction plasma generator was operated under the following conditions:
flow rate of argon gas: 40 l/min
RF power supply
plate voltage: 6 KV
plate current: 2.2 A
reaction pressure: 1 atm.

TABLE 1

| concentration of gas of halogenated organic compound | added gas kind | added gas concentration | Freon 11 decomposition ratio |
| --- | --- | --- | --- |
| 2.2% | | | over 99% |
| 2.2% | H$_2$ | 2.5% | 62% |
| 2.2% | H$_2$O | 2.5% | over 99% |

As can be seen from Table 1, when only a CFC was introduced into the plasma, the decomposition ratio of the Freon 11 exceeded 99%. However, a large amount of carbon adhered to the inner wall of the tube 2. When hydrogen gas was introduced into the plasma together with Freon 11, the decomposition reaction did not proceed after a decomposition ratio of 62% was reached. Also, deposition of carbon was not suppressed. On the other hand, when a mixture of Freon 11 and water was admitted into the plasma, the decomposition rate exceeded 99%. Further, generation of carbon was greatly suppressed. When a metal compound, such as calcium oxide (not shown in Table 1) was added instead of hydrogen gas or water, a metal halide such as calcium chloride or calcium fluoride was obtained. Such metal halides are stable compounds and hardly affect the environment.

Table 2 shows the results of an experiment performed to decompose 1,1,2-trichloro-1,2,2-trifluoroethane (Freon 113) CCl$_2$FCClF$_2$. This experiment shows that when only Freon 113 was decomposed at a rate exceeding 99%, in the same way as Freon 11. When water was added to Freon 113, the decomposition rate exceeded 99%. Also, generation of carbon was greatly suppressed. The used induction plasma generator was operated in the same conditions as in the aforementioned experiment on decomposition of Freon 11.

TABLE 2

| concentration of gas of halogenated organic compound | added gas kind | added gas concentration | Freon 113 decomposition ratio |
| --- | --- | --- | --- |
| 0.57% | | | over 99% |
| 0.57% | H$_2$ | 2.5% | 99% |
| 0.57% | H$_2$O | 2.6% | over 99% |

Figure 2:
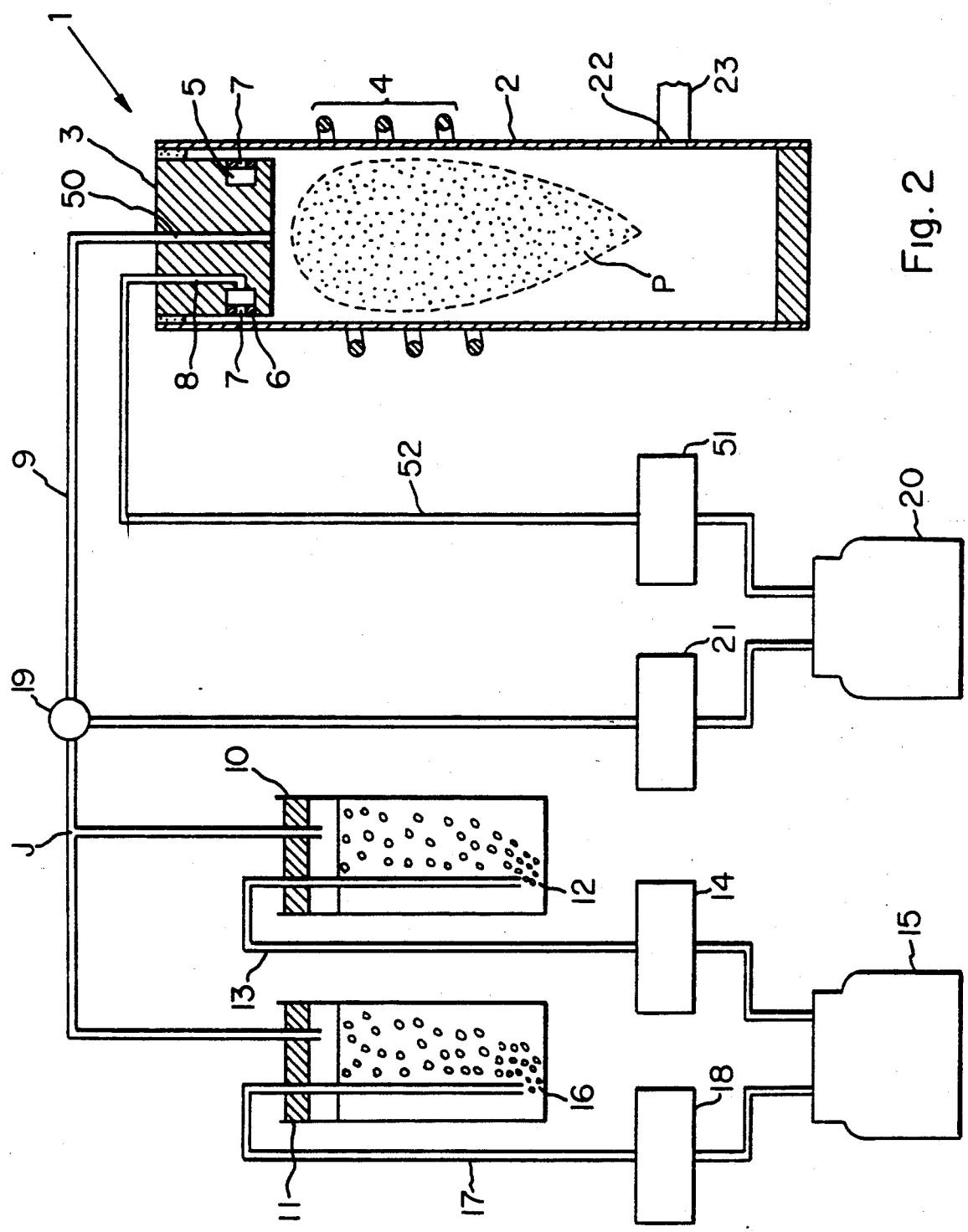
FIGS. 2 and 3 are schematic diagrams of other systems according to the invention for decomposing a halogenated organic compound.

Referring to FIG. 2, there is shown another system according to the invention. It is to be noted that like components are denoted by like reference numerals throughout all the figures. In this example, a torch 1 has a nozzle 3 provided with a hole 8 connected with a groove 5. The nozzle 3 is centrally provided with a hole 50. A tube 9 through which carrier gas flows from a first container 10 and a second container 11 is connected with the central hole 50. In the first container 10, argon has is bubbled through a halogenated organic compound. In the second container 11, argon gas is bubbled through water. A tube 52 is connected with the hole 8 and also with an argon gas source 20 via a flow controller 51.

In this example, when the system is in its initial condition, the selector valve 19 mounted in the tube 9 is operated to supply argon gas from the argon gas source 20 into the hole 50 in the nozzle 3. The argon gas from the argon gas source 20 is supplied into the groove 5 via the hole 8, at a flow rate controlled by the flow controller 51. Therefore, inside the tube 2, argon gas is ejected at two locations, i.e., from minute holes 7 in the plate 6 and from the hole 50. Under this condition, RF waves are supplied to an RF coil 4, and a plasma P is ignited by an igniting mechanism.

Thereafter, the selector valve 19 is switched to the other state. Instead of the argon gas from the argon gas source 20, the gases from the first container 10 and the second container 11 are ejected into the tube 2 via the hole 50 in the nozzle 3. As a result, the halogenated organic compound admitted into plasma P is decomposed at a high efficiency because of high temperature, in the same way as in the example described already in connection with FIG. 1.

Figure 3:
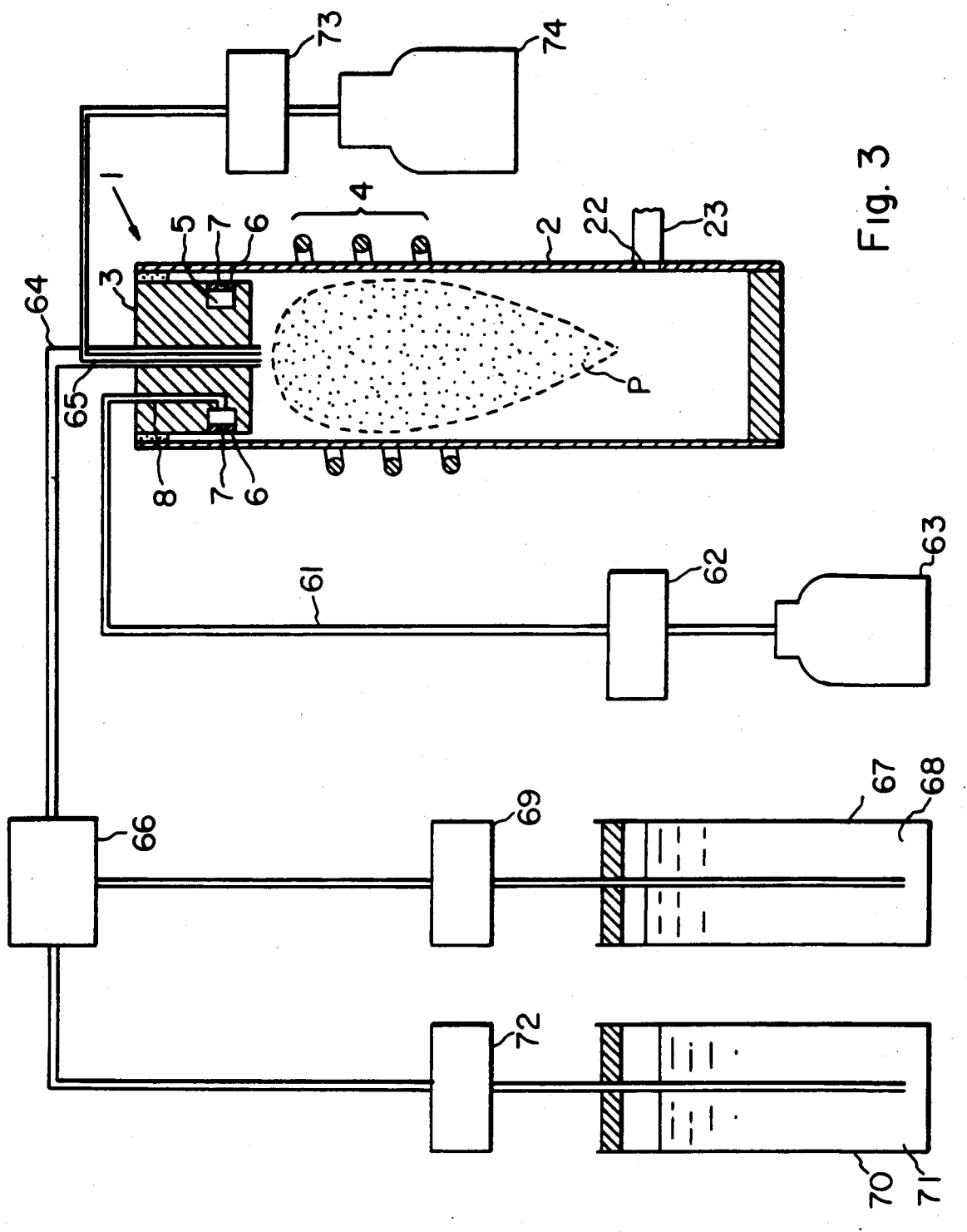

Referring to FIG. 3, there is shown a further system according to the invention. A torch 1 has a nozzle 3 provided with a hole 8 connected with a groove 5. A tube 61 is connected with the hole 8 and also with an argon gas source 63 via a flow controller 62. A tube 64 is inserted into the central portion of the nozzle 3. A tube 65 is mounted inside the tube 64. Therefore, the central portion of the nozzle 3 is of double structure. The outer tube 64 is connected with a mixer 66. A halogenated organic compound 68 held in a container 67 is supplied into the mixer 66 by a pump 69. Also, water 71 received in a container 70 is supplied into the mixer 66 by a pump 72. The tube 65 is connected with an argon gas source 74 via a flow controller 73.

In the initial state of the system constructed as described above, argon gas is supplied at an adequate flow rate from the argon gas source 63 via the flow controller 62, forced through the tube 61, the hole 8, the groove 5, and the minute holes 7, and ejected into the tube 2. Under this condition, RF waves are fed to an RF coil 4 to ignite a plasma P by an igniting mechanism (not shown). Then, the pumps 69 and 72 are operated to supply both halogenated organic compound and water into the mixer 66, where they are mixed together. The mixture liquid passes through the tube 64 into the outer tube of the double tubes mounted in the center of the nozzle 3.

Argon gas is supplied from the argon gas source 74 into the inner tube 65 of the double tubes in the center of the nozzle 3 at a flow rate controlled by the flow controller 73. At the front end of the double tubes, argon gas is ejected from the inner tube. This atomizes the mixture of the halogenated organic compound and water supplied from the outer tube of the double tubes. The atomized mixture is introduced into the plasma together with argon gas.

Figure 4:
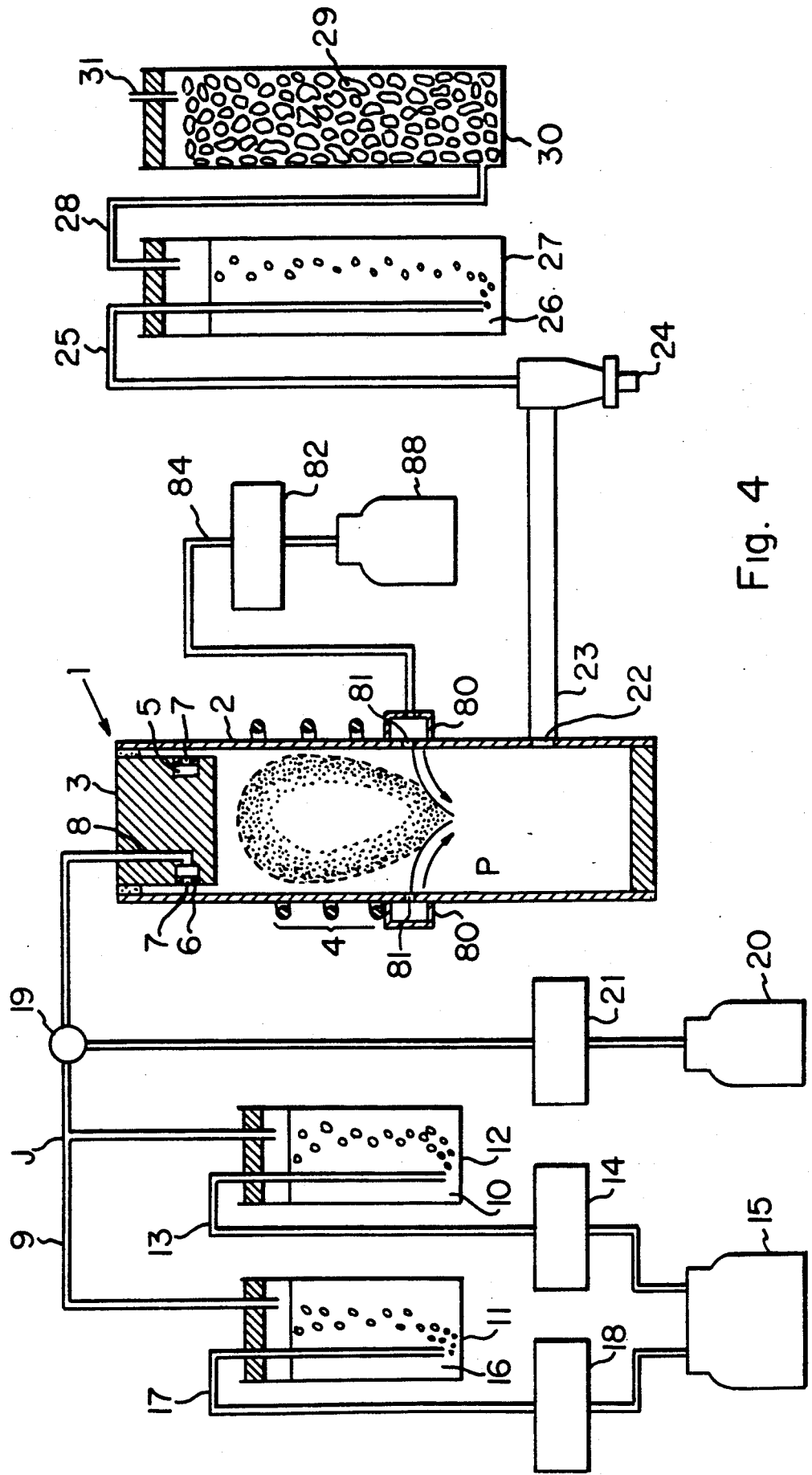
FIG. 4 is a schematic diagram of a further system according to the invention for preventing generation of hazardous by-products.

The decomposition of Freon 11 proceeds within the plasma as given by equation (1) above. If reacting substances are maintained at high temperatures for a long time, the decomposition reaction proceeds further, producing hazardous substances such as dioxin. FIG. 4 shows an example of the invention which is designed, taking the above consideration into account. In this example, an annular passage 80 is formed in the tube 2. A multiplicity of minute holes 81 are formed in the inner wall of the passage 80. A tube 84 which is connected with an argon gas source 88 via a flow controller 82 is connected with the passage 80. The flow rate of the gas from the argon gas source 88 is appropriately controlled by the flow controller 82, and the gas is supplied into the passage 80. Then, the argon gas is ejected into the tube 2 from numerous minute holes 11.

In the system described just above, the argon gas from the minute holes 81 in the passage 80 is injected into the plasma P. Consequently, the plasma is momentarily cooled. The portion of the plasma into which gas stream is admitted disappears. Hence, the decomposed halogenated organic compound is prevented from being placed in the plasma for a long time. Thus, no excessive reactions proceed. In this way, production of hazardous by-products is prevented.

In the above examples, argon gas is ejected into plasma. If generation of $NO_x$ produces no problems, nitrogen gas may be ejected. Also, water may be ejected instead of gas. In this case, HCl and HF produced by decomposition are absorbed into water. This absorption is promoted by ejecting an alkaline water solution into plasma flame and neutralizing the acids. An alkaline gas such as ammonia may be used to neutralize the acids. In this case, the acid gases can be converted into solids such as ammonium chloride and ammonium fluoride by neutralization. Also in the above examples, argon gas is ejected from the minute holes 11 to extinguish plasma. Alternatively, an annular slit is formed, and gas or liquid is injected into a plasma from this slit.

While the invention has been particularly shown and described with reference to preferred embodiments thereof, it will be understood by those skilled in the art that the foregoing and other changes in form and details can be made therein without departing from the spirit and scope of the invention. In the example shown in FIG. 1, the nozzle of the torch is provided with a single groove. Argon gas and carrier gas containing a vaporized halogenated organic compound are interchangeably supplied into the groove. The carrier gas is caused to contain the vapor of the organic compound by bubbling gas through the organic compound. The nozzle may also be provided with two grooves one of which is supplied with argon gas and carrier gas interchangeably. The carrier gas is made to contain a vaporized halogenated organic compound by bubbling gas through the organic compound. The other groove is constantly supplied with argon gas. Also in the above examples, halogenated organic compounds are decomposed by an RF induction plasma generator. This plasma generator for decomposing the compounds may be of direct heating type. In the above description, halogenated organic compounds in liquid phase are introduced into plasma. The invention is also applicable to the case in which halogenated organic compounds in gaseous or liquid phase are decomposed.

Having thus described our invention with the detail and particularity required by the Patent Laws, what is claimed and desired to be protected by Letters Patent is set forth in the following claims.

What is claimed is:

1. A method of decomposing a halogenated organic compound, said method comprising the step of introducing the halogenated organic compound together with a substance into a plasma to decompose the organic compound, the substance selected to react with dissociated components of the halogenated organic compound decomposed in the plasma and such that the decomposition of the organic compound is not inhibited and carbon deposits are suppressed.

2. A method of decomposing a halogenated organic compound as set forth in claim 1, wherein said plasma is produced by an RF induction plasma generator.

3. A method of decomposing a halogenated organic compound as set forth in claim 1, wherein said substance is water.

4. A method of decomposing a halogenated organic compound as set forth in claim 1, wherein said substance is a metal compound.

5. A method of decomposing a halogenated organic compound as set forth in claim 1, further comprising the step of introducing the substances obtained by the decomposition in the plasma into an alkaline solution to neutralize the substances.

6. A method of decomposing a halogenated organic compound, said method comprising the steps of:
    bubbling a carrier gas through the halogenated organic compound that is in liquid phase, so that the compound is contained in the carrier gas;
    bubbling the carrier gas through a liquid substance for reacting with the decomposed halogenated organic compound so that the liquid substance may be contained in the carrier gas;
    mixing the carrier gas containing the halogenated organic compound with the carrier gas containing the liquid substance; and
    introducing the mixture gas into a plasma.

* * * * *

UNITED STATES PATENT AND TRADEMARK OFFICE
CERTIFICATE OF CORRECTION

PATENT NO. : 5,026,464

DATED : June 25, 1991

INVENTOR(S) : Koichi Mizuno, Takeshige Wakabayashi et al.

It is certified that error appears in the above-identified patent and that said Letters Patent is hereby corrected as shown below:

Title Page:

Under Foreign Application Priority Data
 "Aug. 31, 1988 [JP] Japan ... 1-225211" should read
 --Aug. 31, 1989 [JP] Japan ... 1-225211--.

Column 2 Line 37 "cas" should read --gas--.

Column 3 Line 31 "it" should read --is--.

Column 3 Line 63 "has" should read --gas--.

Column 5 Line 61 "has" should read --gas--.

Signed and Sealed this

Twenty-seventh Day of October, 1992

*Attest:*

DOUGLAS B. COMER

*Attesting Officer*       *Acting Commissioner of Patents and Trademarks*